June 14, 1966 L. O. DOWNES 3,255,564
STRUCTURAL PARTITIONING SYSTEM
Filed June 8, 1962 5 Sheets-Sheet 2
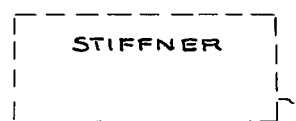
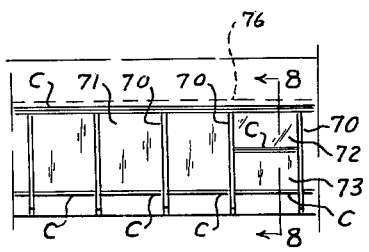
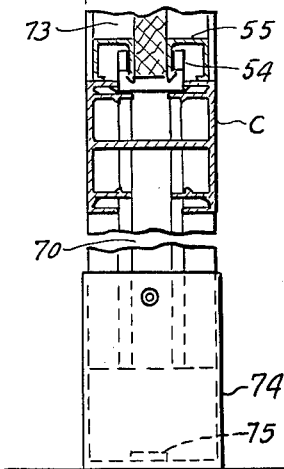
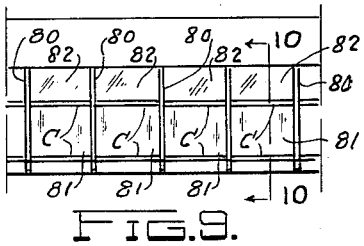
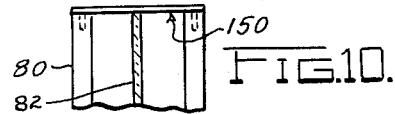
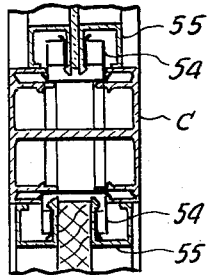
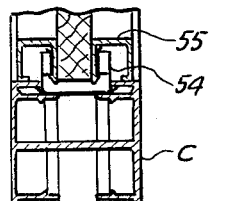
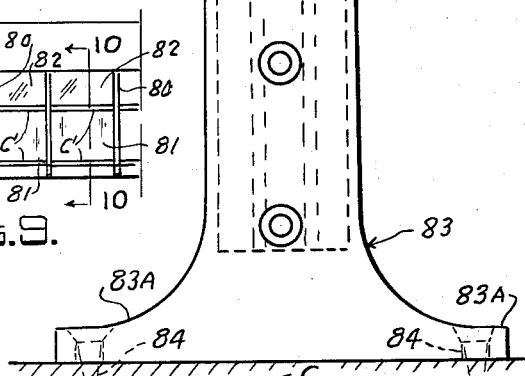
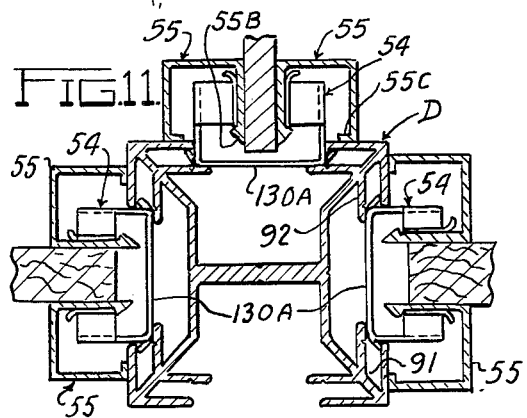
INVENTOR
BY LEONARD O. DOWNES
ATTORNEYS

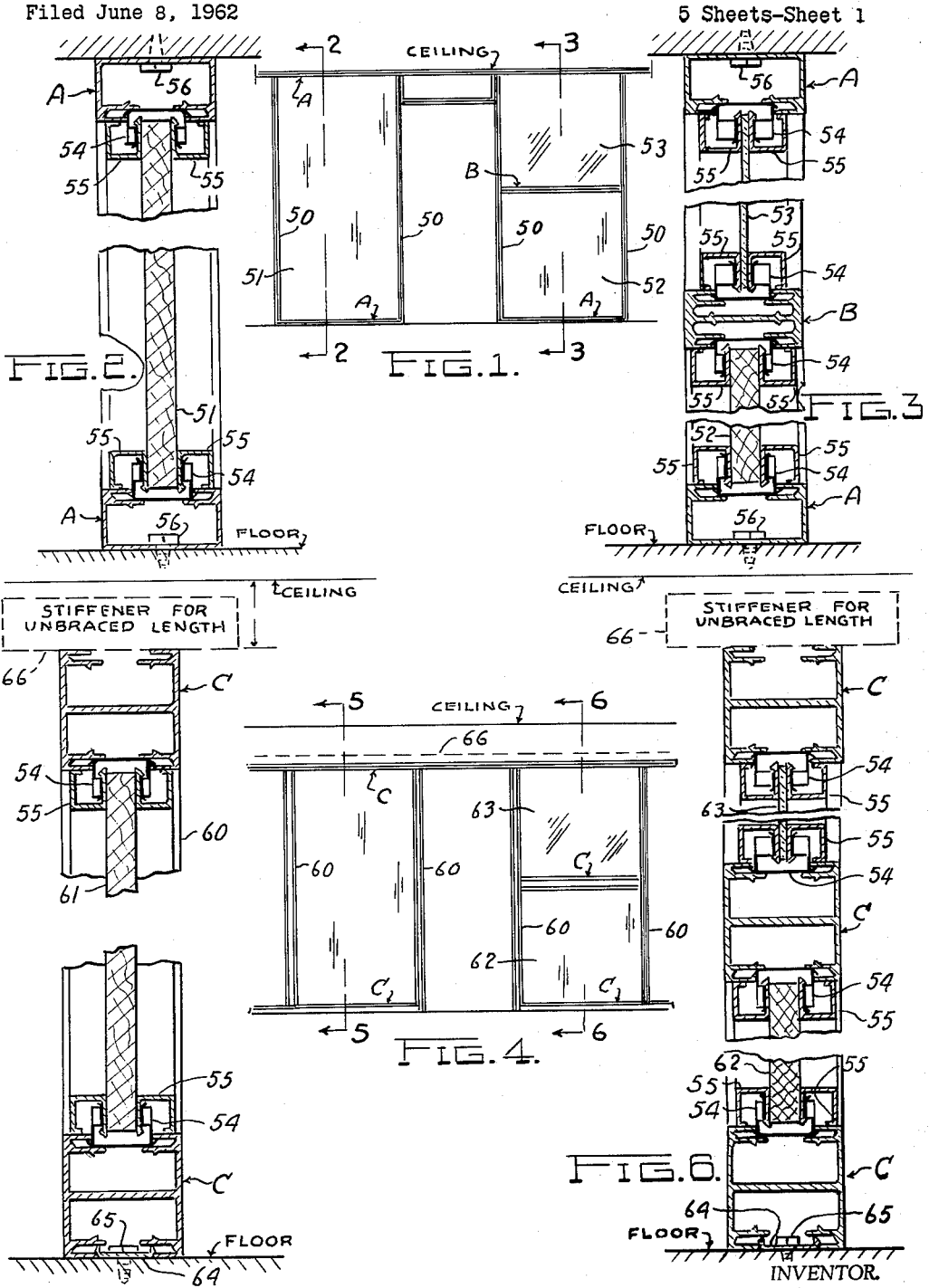

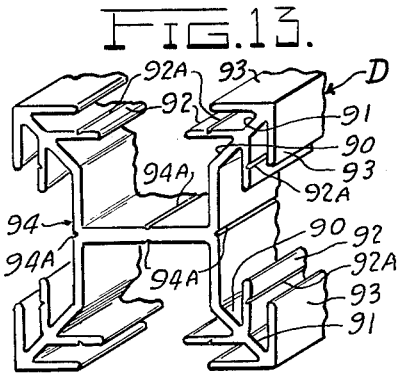
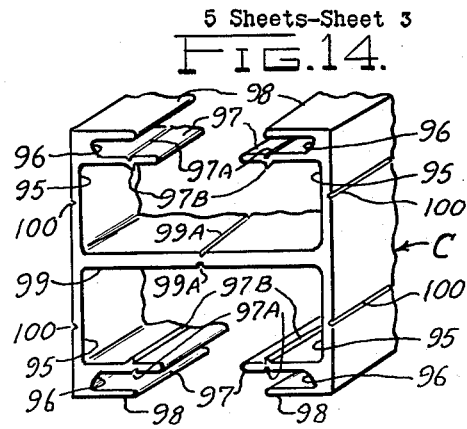
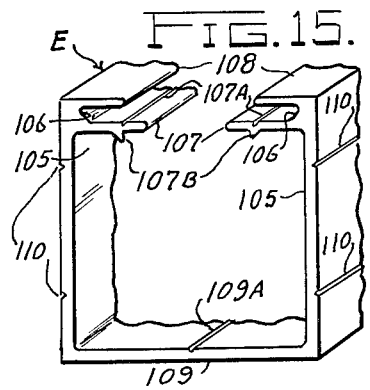
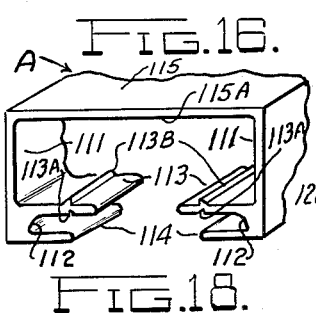
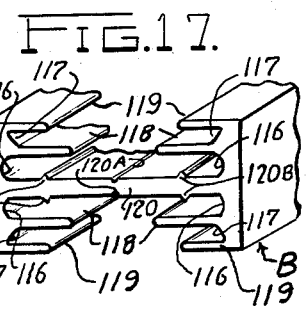
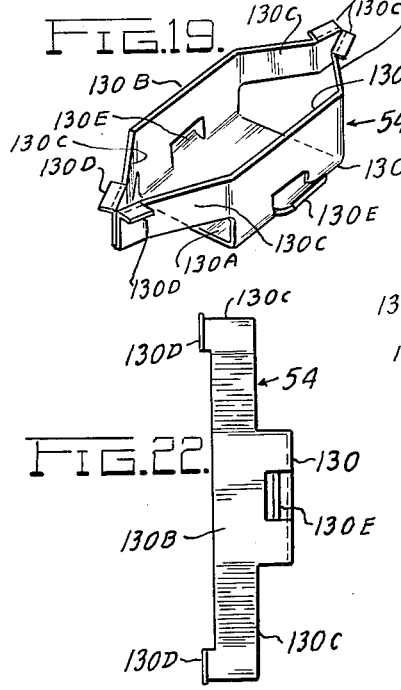
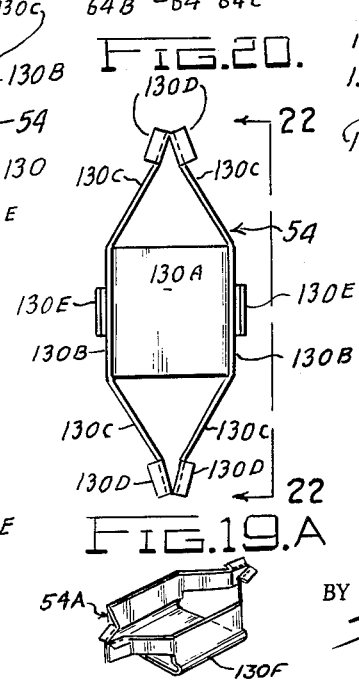
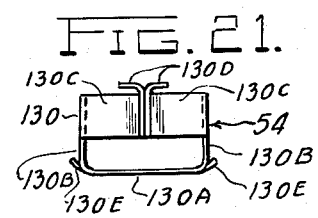
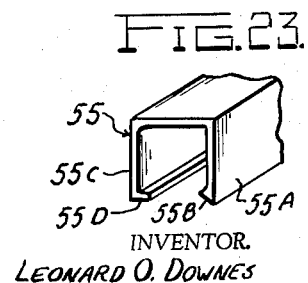
INVENTOR.
LEONARD O. DOWNES June 14, 1966 L. O. DOWNES 3,255,564
STRUCTURAL PARTITIONING SYSTEM
Filed June 8, 1962 5 Sheets-Sheet 4
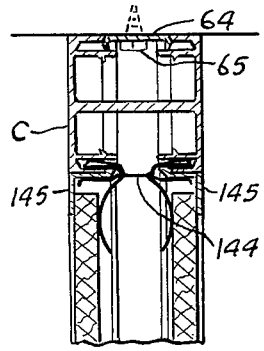
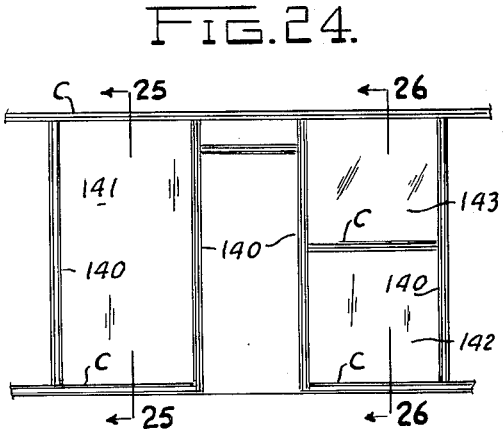
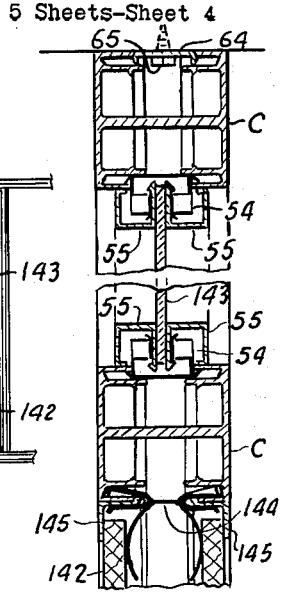
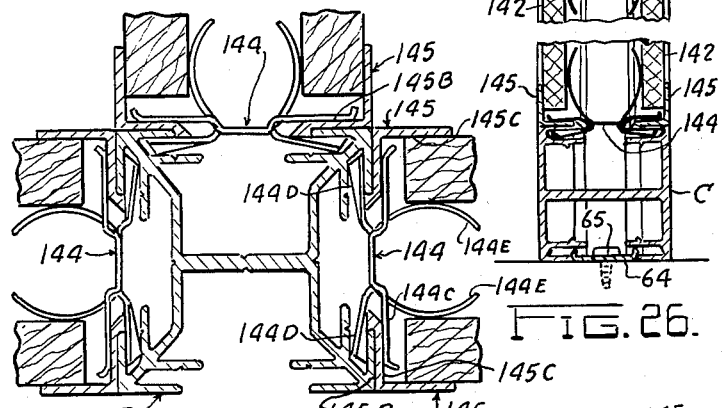
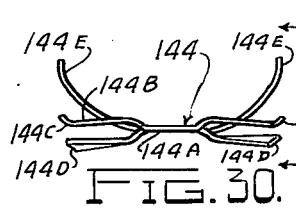
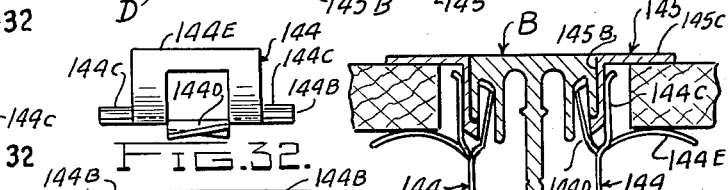
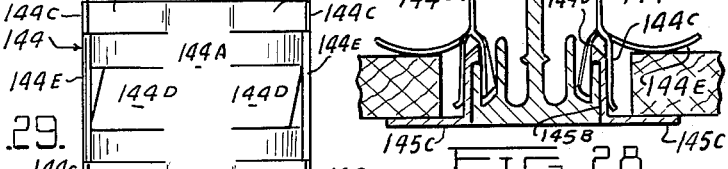
INVENTOR.
LEONARD O. DOWNES
BY
Hauke & Hauke
ATTORNEYS

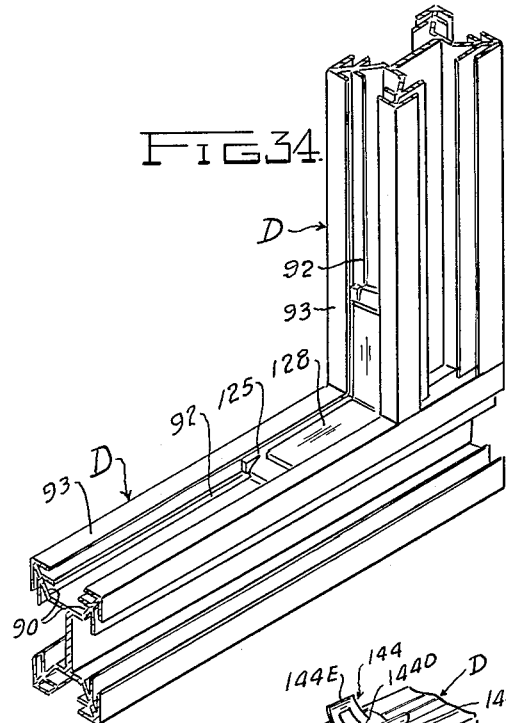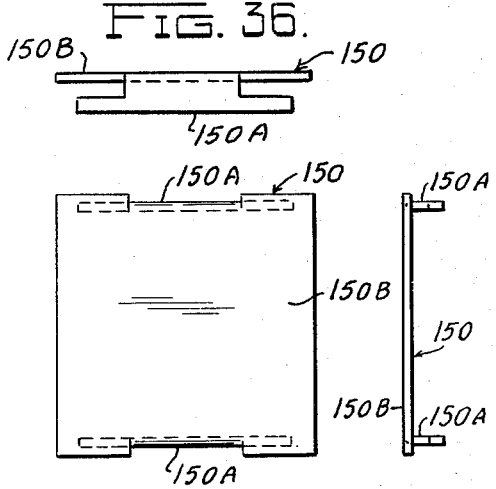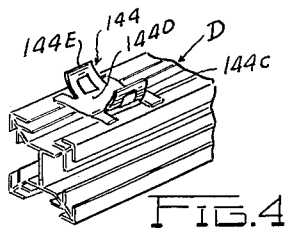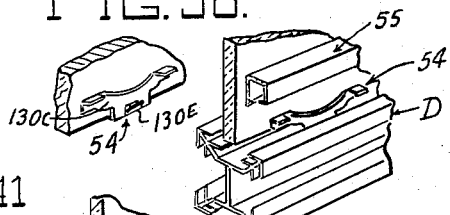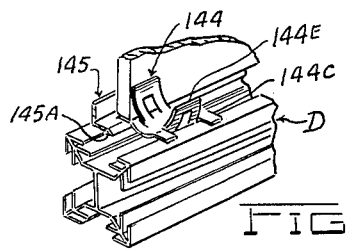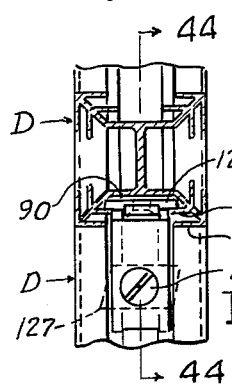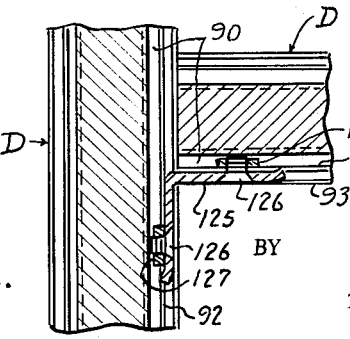

United States Patent Office 3,255,564
Patented June 14, 1966

3,255,564
STRUCTURAL PARTITIONING SYSTEM
Leonard O. Downes, 4077 2nd St., Wayne, Mich.
Filed June 8, 1962, Ser. No. 201,024
6 Claims. (Cl. 52—498)

My invention relates to a partition system, and more particularly to a new system of readily assembled cooperating support structures for supporting and retaining panels of a variety of thicknesses and materials within the open spaces formed by a unique framing structure.

In the development of partition systems heretofore, various limitations and disadvantages have been found to exist preventing a single system from serving many uses or being architecturally acceptable apart from specific installations.

Architecturally, panelling systems now in use, unless custom made, are generally unsatisfactory for most interiors since they lack the clean modern lines, finished joints and edges, and have various exposed brackets and miscellaneous connecting elements, screws, bolts and the like. Moreover, for practical reasons, most systems are unsatisfactory because they require skilled assemblers and the use of many tools, are not readily dismounted or altered when desired, and are not easily maintained.

An object of the present invention is to improve partition systems by combining new extrusion and connecting members permitting free and unobstructed assembly with panel support elements.

Another object of the invention is to facilitate partitioning by assembling new framing and supporting elements enabling the installation of a variety of panel configurations.

A further object of the invention is to provide architecturally acceptable interior partitioning by constructing new and readily connected framing and support elements operable to conceal all connections.

Yet another object of the invention is to expand the versatility of partition systems by providing improved framing and support elements adaptable for single and double panel partitioning with uniformity of appearance.

A still further object of the invention is to facilitate partition construction by providing new elements readily assembled with a minimum of tools.

For a more complete understanding of the invention, reference may be had to the accompanying drawings illustrating preferred embodiments of the invention in which like reference characters refer to like parts throughout the several views and in which FIG. 1 is a fragmentary elevational view of a single panel partition assembly constructed according to a preferred embodiment of the invention.

FIG. 2 is a cross-sectional view taken on the line 2—2 of FIG. 1.

FIG. 3 is a cross-sectional view taken on the line 3—3 of FIG. 1.

FIG. 4 is a fragmentary elevational view of another single panel partition assembly.

FIG. 5 is a cross-sectional view taken on the line 5—5 of FIG. 4.

FIG. 6 is a cross-sectional view taken on the line 6—6 of FIG. 4.

FIG. 7 is a fragmentary elevational view of yet another single panel partition assembly.

FIG. 8 is a cross-sectional view taken on the line 8—8 of FIG. 7.

FIG. 9 is a fragmentary elevational view of a still further single panel partition assembly.

FIG. 10 is a cross-sectional view taken on the line 10—10 of FIG. 9.

FIG. 11 is a fragmentary cross-sectional view of the juncture of multiple single panel partition assemblies.

FIG. 12 is a fragmentary cross-sectional view of the juncture of two single panel partition assemblies incorporating different thicknesses of panels.

FIG. 13 is a fragmentary perspective end view of a framing member used to support various partition assemblies.

FIG. 14 is a fragmentary perspective end view of another such framing member.

FIG. 15 is a fragmentary perspective end view of a further such framing member.

FIG. 16 is a fragmentary perspective end view of still another such framing member.

FIG. 17 is a fragmentary perspective end view of yet another such framing member.

FIG. 18 is a fragmentary perspective view of a batten strip adapted for assembly with the framing members of FIGS. 13 through 17.

FIG. 19 is a perspective view of a panel retaining clip element adapted for assembly with the aforesaid framing members when used with single panel construction.

FIG. 19A is a perspective view of a modified clip element.

FIG. 20 is an elevational top view of the element of FIG. 19.

FIG. 21 is an elevational end view of the element of FIG. 19.

FIG. 22 is an elevational side view of the element of FIG. 19 as seen from the line 22—22 of FIG. 20.

FIG. 23 is a fragmentary perspective end view of a molding member adapted for use in the aforesaid single panel constructions.

FIG. 24 is a fragmentary elevational view of a double panel partition assembly constructed according to another preferred embodiment of the invention.

FIG. 25 is a cross sectional view taken on the line 25—25 of FIG. 24.

FIG. 26 is a cross-sectional view taken on the line 26—26 of FIG. 24.

FIG. 27 is a fragmentary cross-sectional view of the juncture of multiple double panel partition assemblies.

FIG. 28 is a fragmentary cross-sectional view of the juncture of two double panel partition assemblies.

FIG. 29 is a perspective view of a panel retaining clip element adapted for assembly with the framing members of FIGS. 13 through 17 when used with double panel construction.

FIG. 30 is an end elevational view of the element of FIG. 29.

FIG. 31 is a top plan view of the element of FIG. 29.

FIG. 32 is a side elevational view of the element of FIG. 29 as seen from the line 32—32 of FIG. 30.

FIG. 33 is a fragmentary end elevational view of a molding member adapted for use in the aforesaid double panel construction.

FIG. 34 is a fragmentary perspective view of a framing member assembly adapted for use with any of the aforesaid panel constructions.

FIG. 35 is an elevational plan view of a framing member end closure element.

FIG. 36 is an elge view of the element of FIG. 35 as viewed from the top side thereof.

FIG. 37 is an edge view of the element of FIG. 35 as viewed from the right side thereof.

FIGS. 38, 39 and 40 are fragmentary perspective views illustrating steps in the assembly of the aforesaid single panel constructions.

FIGS. 41 and 42 are fragmentary perspective views illustrating steps in the assembly of the aforesaid double panel constructions.

FIG. 43 is a fragmentary cross-sectional view of the framing member assembly of FIG. 34, and FIG. 44 is a cross-sectional view taken on the line 44—44 of FIG. 43.

The structural framing members, adapted for use in the present system, as new articles of manufacture, are more fully shown and described in my now abandoned application Ser. No. 201,032, filed June 8, 1962.

The basic framing system, utilizing the above members for framing in the spaces on which the panels of the present system are superimposed, is more completely shown and described in my copending application Ser. No. 201,021, filed June 8, 1962.

Another partitioning system, readily combined with, and architecturally and visually compatible with, the present system, is more fully disclosed in my copending application Ser. No. 201,019, filed June 8, 1962, now Patent No. 3,193,061.

Door framing structure used with the above and the present partition system is illustrated and described more fully in my now abandoned application Ser. No. 222,296, filed Sept. 10, 1962.

My copending applications Serial No. 227,370, filed Oct. 1, 1962 and Ser. No. 222,294, filed Sept. 10, 1962, and now Patent No. 3,166,285 respectively cover the electrical fixture and shelf bracket assemblies devised for use in the present and other compatible systems.

Reference to the above copending applications and now now issued patents will provide fuller appreciation of the broad versatility of the present system and its innumerable combinations.

FIGS. 1–3 illustrate a preferred floor-to-ceiling single wall panel assembly embodying the present invention, including vertical framing members 50, upper and lower horizontal headers comprising framing members similar in cross section and indicated by the letters A, illustrated more fully in FIG. 16. Also included is an intermediate framing member B, illustrated more fully in FIG. 17.

These members are assembled to frame and support a long panel 51 of wood or other panelling material, a short panel 52, and a window panel 53. These panels are mounted by means of clip elements 54, illustrated more fully in FIGS. 19–22, the clip elements 54 and the panel edges being concealed by molding members 55 on both sides. The molding members 55 are illustrated more fully in FIG. 23. The members A are preferably secured to floor and ceiling by screws 56 or the like.

FIGS. 4–6 illustrate a preferred open-ceiling single wall panel assembly, including vertical framing members 60, upper and lower headers and an intermediate header comprising framing members similar in cross-section and indicated by the letters C, illustrated more fully in FIG. 14.

These members are assembled to frame and support a long panel 61, a short panel 62, and a window panel 63. These panels are mounted by means of the same elements and members 54 and 55 used in the assembly of FIGS. 1–3. The lower header C is mounted by means of a snap-in batten strip 64, illustrated more fully in FIG. 18, and which is secured to the floor by screws 65 or the like. The upper header C is spaced from the ceiling, and if desired may be stiffened by any means such as a board 66 or the like.

FIGS. 7 and 8 illustrate a preferred cubicle single wall panel assembly, including vertical framing members 70, upper and lower, and if desired intermediate, headers comprising framing members C, shown in FIG. 14.

These members are assembled to frame and support panels 71, 72 and 73. These panels also are supported by means of the same elements 54 and 55 used in the previously described assemblies. The lower headers C are spaced from the floor and are secured intermediate the vertical framing members 70 in a manner to be described. The lower ends of the members 70 are preferably carried in and adjustably supported by foot members 74 which are secured to the floor by any means such as screws 75 or the like. The upper header C is supported on the upper ends of the vertical members 70, and may if desired be stiffened by an means such as a board 76 or the like (not included in FIG. 7).

FIGS. 9 and 10, illustrate a preferred glazed rail single wall panel assembly, including vertical framing members 80, intermediate and lower headers also comprising framing members C shown in FIG. 14.

These members are assembled to frame and support opaque panels 81 and glass panels 82. These panels also are supported by the elements 54 and 55 as previously described. The lower headers C are secured intermediate the vertical members 80 and are spaced from the floor. The lower ends of the members 80 are preferably carried in and adjustably supported by base members 83 having feet 83A secured to the floor by any means such as screws 84 or the like.

The various vertical members 50, 60, 70 and 80 previously described may or may not confirm in cross-section to the types of headers with which they are assembled, depending on the number of recessed sides needed.

Various types of framing members may be utilized in the assemblies heretofore described. Types A, B and C have already been noted. Other types, designated as D and E, are illustrated in FIGS. 13 and 15 respectively.

It will be noted that the various types of framing members have certain features in common. They each have at least one flat side having a longitudinal recess so slotted to provide inner recess and outer pairs of flanges.

In FIG. 13, the member D has four flat sides each having a longitudinal medial recess laterally slotted at 90 and 91 to form inner flanges 92 and outer flanges 93. As seen, this member D has an H-shaped portion 94 with the flange-carrying leg ends inclined as shown. Breaking grooves 92A are provided on the inner flanges 92, and medial grooves 94A for accurately locating any needed screw holes or the like are provided in the H-shaped portion 94.

In FIG. 14, the member C has four flat sides, only two of which have longitudinal medial recesses laterally slotted at 95 and 96 to form inner flanges 97 and outer flanges 98. The member C is generally H-shaped with a medial web 99, the leg ends carrying the flanges 97 and 98. Breaking grooves 97A are provided on the inner flanges 97, medial grooves 99A for accurately locating any needed screw holes or the like are provided in the web 99, and decorative grooves 100 are preferably provided on the non-recessed sides of the member C. The inner surfaces of the inner flanges 97 are also provided with longitudinal ribs 97B.

In FIG. 15, the member E has four flat sides, only one of which has a longitudinal medial recess laterally slotted at 105 and 106 to form inner flanges 107 and outer flanges 108. The member E is generally C-shaped with a medial web 109, the leg ends carrying the flanges 107 and 108. Breaking grooves 107A are provided on the inner flanges 107, a medial groove 109A for accurately desired screw holes or the like is provided in the web 109, and decorative grooves 110 are preferably provided on the opposite non-recessed sides of the member E. The inner surfaces of the inner flanges 107 are also provided with longitudinal ribs 107B.

The member A of FIG. 16 is substantially of the same form as the member E of FIG. 15, but is only one-half the depth. It has four flat sides, only one of which has a longitudinal medial recess laterally slotted at 111 and 112 to form inner flanges 113 and outer flanges 114. The member A is generally C-shaped with a medial web 115, the leg ends carrying the flanges 113 and 114. Breaking grooves 113A are provided on the inner flanges 113, a medial screw-hole locating groove 115A is provided in the web 115, and longitudinal ribs 113B are provided on the inner surfaces of the inner flanges 113.

The member B of FIG. 17 is similar to the member C of FIG. 14, but is only one-half the depth. It has four flat sides, two of which have longitudinal medial recesses laterally slotted at 116 and 117 to form inner flanges 118 and outer flanges 119. The member is generally H-shaped with a medial web 120, the leg ends carrying the flanges 118 and 119, and longitudinal ribs 120A provided on the web 120.

The members A, B, C, D and E are preferably of extruded aluminum. As new articles of manufacture, these and other members embodying similar features are more completely shown and described in my now abandoned patent application Ser. No. 201,032, filed June 8, 1962.

FIGS. 34, 43 and 44 illustrate the means used for securing one framing member to another. For purposes of illustration members D, as in FIG. 13, are used, although it will be apparent that any of the preferred forms previously described as well as others may be similarly secured to each other. The inner flanges 92 provide seats for positioning and carrying a connecting bracket 125 by means of screws 126 and nuts 127 which are disposed in the slots 90 and operate to clamp the bracket 125 to the inner flange 92. With this arrangement, the brackets 125 can be fully depressed beneath the outer flanges 93, so that the entire area defined by the adjoining framing members is free and unobstructed for the assembly of the panelling, which can thus be connected to the free outer flanges 93. In FIG. 34, the outer surface of the bracket 125 is shown as covered by a strip 128 of sponge rubber or the like to provide, if needed, protection for the edges of glass or other readily damaged panels which can be rested thereon.

The new framing system, including various structural components and also the foot members 74 of FIG. 8 and base members 83 of FIG. 10, is more fully illustrated and described in my copending patent application Ser. No. 201,021, filed June 8, 1962.

FIGS. 19 through 22 illustrate in more detail the clip element 54 which is used to support the panels within the areas defined by the assembled framing members. FIGS. 11 and 12 are enlarged cross-sectional views illustrating the assembly of differing thickness panels in the framing members D and C, in order to clarify the invention embodied in the present application.

The clip element 54 may be readily stamped from a flat strip of spring steel and as shown comprises a C-shaped medial portion 130 having a base web 130A and side webs 130B. A pair of gripping arms 130C extend from opposite ends of the side webs 130B and have laterally outwardly extending flanges 130D at the ends. Flanges 130E are punched out as shown from the side webs 130B near their juncture with the base web 130A. The arms 130C are bent toward each other and the ends are slightly return bent as shown.

A modified clip element 54A is shown in FIG. 19A and is in all respects like the element 54 except that ribs 130F replace the flanges 130E of element 54.

In use, as shown in FIG. 11 for example, the clip 54 is disposed in the longitudinal recess of the framing member D with the base web 130A seated on the inner flanges 92 and the flanges 130E (or ribs 130F when clip 54A is used) lodged in the slots 91. The majority of the clip 54 is thus supported exteriorly of the framing member. The arms 130C grip inner sides 55A of molding members 55, between which are retained the side edges of the panels.

The molding members 55 are each substantially C-shaped longitudinal extrusions, the aforesaid inner side 55A having a ridge 55B at its edge which is retained under the inner edge of the arms 130C of the clip 54. The other, outer side 55C has an inturned flange 55D which is adapted to rest on the outer surface of the outer flange of the framing member.

As installed, the inner side 55A of the member 55 extends slightly within the recess of the framing member so that light will not shine through the space between the edge of the panel and the outer surface of the framing member. The arms 130C of the clips 54, being resilient, will accommodate any thickness of panel, up to the thickness of the right panel of FIG. 12. FIGS. 11 and 12 illustrate varying thicknesses of panels which might be used. The use of the thickest panel will provide that the outer sides 55C of the molding members 55 are flush with the outer sides of the framing member, as seen in FIG. 12.

FIGS. 38 to 40 illustrate steps in the assembly of the members above described to form single panel construction. First, as seen in FIG. 38, clips 54 are installed on the edges of a panel X preferably two to a side and near the ends of the panel edge. The arms 130C resiliently grip the panel. The panel is then placed in the space enclosed by the framing members (D) and the clips 54 pushed outwardly into the framing member recess as shown in FIG. 39, the flanges 130E depressing past the outre flanges (93) of the framing member and snapping into place within the slot provided between the inner and outer flanges. The bottom corners of the panel may rest on the brackets connecting the bottom and vertical framing members. Next, the molding members 55 are installed, the inner sides 55A being inserted between the panel edge and the clip arms 130C until the rib 55B snaps under the inner edges of the arms 130C, the flanges 55D resting on the outer surface of the framing member, as seen in FIG. 40.

With molding members 55 cut to the proper length, they will fully conceal the clips 54 and the edges of the panel, and abut each other at the corners. No connecting elements are exposed, and no gaps exist which would otherwise need to be covered with corner plates.

It will be noted that as fitted together, the clips 54 and molding members 55 act to retain the panel in place, yet permit relative movement required by thermal expansions and contractions. Also, the clips are self supporting in the framing members due to the unique cooperation of clip and recess flanges, and including framing assembly and the clips cooperate with the molding members for usual locking, yet all elements including the framing assembly may be readily disassembled. The need for tools is kept to a minimum.

FIGS. 24–26 illustrate a preferred floor-to-ceiling double wall panel assembly embodying the present invention, including vertical framing members 140, upper and lower horizontal headers and an intermediate header, preferably comprising framing members C previously described and shown in FIG. 14.

These members are assembled to frame and support long double panels 141, short double panels 142, and a window panel 143. The window panel 143 is mounted by means of the same clip elements 54 and molding elements 55 previously described in reference to the various single wall panel constructions. The panels 141 and 142 are mounted by means of clip elements 144, illustrated more fully in FIGS. 29–32, the clip elements 144 and the panel edges being concealed by molding members 145 on both sides. The molding members 145 are illustrated more fully in FIG. 33. The members C are preferably mounted by means of the snap-in batten strips 64 previously described and shown in FIG. 18. The batten strips 64 are secured to floor and ceiling by screws 65 or the like.

The clip element 144 as shown in FIGS. 29–32 is preferably stamped from a plate of spring steel and comprises a central flat strip 144A having pairs of arm elements 144B extending oppositely from each side and bent at the ends as at 144C. Oppositely twisted medial arms 144D extend from opposite sides of the strip 144A between the legs of curved and substantially C-shaped portions 144E, the ends of the legs being integral with the strip 144A.

The molding member 145 as shown in FIG. 33 preferably comprises an L-shaped extrusion having an offset rib 145A disposed along the edge of one side portion 145B.

FIGS. 27 and 28 illustrate the assembly of the clips 144 and molding members 145 with framing members D and B. The medial arms 144D are disposed in the recesses between the inner and outer flanges of the framing member previously described, and are resiliently urged due to the twist of the arms 144D, against the inner surfaces of the outer flanges.

The arms 144C clamp the side portions 145B of the molding members 145 against the outer surfaces of the framing member outer flanges. The edges of the panels are clamped between the curved portion 144E and the other sides 145C of the molding members 145.

FIGS. 41 and 42 illustrate steps in the assembly of the clip 144 and member 145 with the framing member D to support a panel X. The arms 144D of the clip 144 are narrower than the space-between the outer flanges of the member D so they may be inserted into the framing member's longitudinal recess; then the clip 144 is rotated to the position of FIG. 41 so that the outer flanges are clamped between the arms 144C and 144D. The panel edge is then set upon the arms 144C and pressed against the curved portion 144E, after which the side 145B is inserted between the arms 144C and the outer surface of the framing member outer flange so that the rib 145A snaps over the inner edge of the outer flange as shown in FIG. 42. It will be seen that in this double wall system the sides 145C of the molding members 145 fit flush with the corners of the framing members for an architecturally clean appearance. It will be apparent also that the rib 145A prevents light from passing the edge of the panel.

The batten strips 64, shown in FIG. 18 are used to close any open recesses of the longitudinal framing members, and as indicated in FIGS. 5, 6, 25 and 26, can be used to secure framing members to floor and ceiling. The strips 64 have ribs 64A disposed on the outer sides of edge flanges 64B. The ribs are operable to engage under the edges of the framing member outer flanges and the edges of the flanges 64B seat on the inner flanges of the framing member. A longitudinal medial groove 64C is provided as shown in FIG. 18 to accurately locate the screw holes which may have to be drilled.

A cap member 150, shown in FIGS. 35–37, is used to close the end of framing members which might otherwise be exposed, such as in FIG. 10. The member 150 has flanges 150A bent normal to a flat plate portion 150B, the flanges 150A being spaced to fit inside the outermost faces or outer flanges of any of the framing members utilized in the present system.

All of the elements of the single and double wall panel systems above described are adaptable to the construction of innumerable varieties and size of partitions. The key to the versatility of assembly is primarily the structure of the framing members, having inner and outer flanges so that the special clips and moldings are readily secured thereto without special tools and without screws, bolts or other conventional fastening means, and in which the brackets securing the framing members together don't obstruct other parts. The single and double wall systems may thus be used together where desired without any modifications to produce substantially uniform appearance and without the need for corner plates or other elements which in former systems were used to conceal unsightly joints and gaps.

For the construction of door framing assemblies to be used in the present systems, reference may be had to my now abandoned application Ser. No. 222,296, filed Sept. 10, 1962. Another compatible panelling system is described in my copending application Ser. No. 201,019, filed June 8, 1962, now Patent No. 3,193,061. Electrical fixture assemblies and a new shelf bracket for use in the present systems are shown respectively in applications Ser. Nos. 227,370 and 222,294, now Patent No. 3,166,285 and filed Oct. 1, 1962 and Sept. 10, 1962 respectively.

Although I have described only a few embodiments of the present invention, it will be apparent to one skilled in the art to which the invention pertains that various changes and modifications may be made therein without departing from the spirit of the invention or the scope of the appended claims.

I claim:

1. In a partition system
   (a) a longitudinal framing member having at least one flat side and a medial longitudinal recess therein,
   (b) inner and outer spaced parallel flanges extending from opposite sides of said recess, said inner flanges extending farther inwardly than said outer flanges,
   (c) a resilient clip element seated on said inner flanges and having portions resiliently engaging said framing member intermediate said inner and outer flanges whereby said clip element is resiliently secured to said framing member,
   (d) said clip element having a pair of spaced, resilient arm portions extending outwardly from said framing member,
   (e) a panel member extending normal to said flat side of said framing member and having an edge portion disposed intermediate said arm portions of said clip element,
   (f) a longitudinally extending molding element having a portion disposed intermediate one of said arm portions of said clip element and said edge portion of said panel member,
   (g) said arm portion resiliently clamping said molding element against said edge portion of said panel member whereby to clamp said molding element and said panel member to said framing member.

2. In a partition system
   (a) a longitudinal framing member having at least one flat side and a medial longitudinal recess therein,
   (b) inner and outer spaced parallel flanges extending from opposite sides of said recess, said inner flanges extending farther inwardly than said outer flanges,
   (c) a resilient clip element seated on said inner flanges and having portions resiliently engaging said framing member intermediate said inner and outer flanges whereby said clip element is resiliently secured to said framing member,
   (d) said clip element having a pair of spaced, resilient arm portions extending outwardly from said framing member,
   (e) a panel member extending normal to said flat side of said framing member and having an edge portion disposed intermediate said arm portions of said clip element,
   (f) longitudinally extending molding elements disposed on each side of said edge portion of said panel member,
   (g) each of said molding elements having a portion disposed intermediate one of said arm portions of said clip element and said edge portion of said panel member,
   (h) said arm portions resiliently clamping said molding elements against said edge portion of said panel member whereby to clamp said molding elements and said panel member to said framing member.

3. In a partition system
   (a) a longitudinal framing member having at least one flat side,
   (b) said flat side being provided with a longitudinal recess,
   (c) said framing member being further provided with a pair of flanges extending from each of the opposite sides of said recess, the innermost of said pairs of flanges extending farther inwardly than the outermost of said flanges, (d) a clip element having portions engaging intermediate each of said pairs of flanges,
(e) a panel member extending normal to said flat side framing member,
(f) said clip element being seated on said innermost flanges and being provided with portions extending intermediate said flanges and outwardly extending and spaced resilient arm portions clamping said panel member to said framing member, and
(g) a molding element engaging said flat side and having a surface engaging said panel member,
(h) said arm portion of said clip element engaging said molding element and resiliently urging said surface into clamping engagement with said panel member.

4. In a partition system
(a) longitudinal framing member having at least one flat side and a substantially medial longitudinal recess being formed in said flat side,
(b) inner and outer parallel flanges extending from opposite sides of said recess, said inner flanges extending farther inwardly than said outer flanges,
(c) a panel member having an edge disposed adjacent said flat side and in a plane substantially normal thereto,
(d) supporting means connecting said edge and said framing member and comprising a clip element having a portion insertable into said recess and being supported by said inner flanges and means resiliently extending intermediate said flanges whereby said clip element is securely locked to said framing member, and
(e) said clip element further comprising a pair of spaced arm portions extending outwardly from said recess to be positioned on opposite sides of said panel and to securely clamp said panel to said framing member.

5. The partition system as defined in claim 4 and including a molding element disposed on each side of said panel, each of said molding elements having a portion disposed intermediate said arm portions of said clip element and said panel.

6. The partition system as defined in claim 5 and in which said molding members each have an edge extending into said recess whereby to block direct light transmission across said framing member flat side.

References Cited by the Examiner

UNITED STATES PATENTS

| | | | |
|---|---|---|---|
| 1,667,534 | 4/1928 | Carpenter et al. | 52—494 |
| 2,711,233 | 6/1955 | Pierce | 52—214 |
| 2,882,561 | 4/1959 | Shrode | 52—502 |
| 2,963,131 | 12/1960 | Brockway | 52—122 |
| 2,983,969 | 5/1961 | Muessel | 52—397 |
| 3,066,770 | 12/1962 | Millard et al. | 52—220 |
| 3,157,918 | 11/1964 | Adams | 52—501 |

FOREIGN PATENTS

| | | |
|---|---|---|
| 1,221,507 | 1/1960 | France. |
| 1,231,738 | 4/1960 | France. |
| 1,074,846 | 2/1960 | Germany. |

FRANK L. ABBOTT, *Primary Examiner.*

HENRY C. SUTHERLAND, RICHARD W. COOKE, *Examiners.*

J. L. RIDGILL, *Assistant Examiner.*